Sept. 6, 1955  R. F. WILD  2,717,359
MEASURING APPARATUS
Filed June 17, 1950  2 Sheets-Sheet 1

INVENTOR.
RUDOLF F. WILD
BY
Arthur H. Swanson
ATTORNEY.

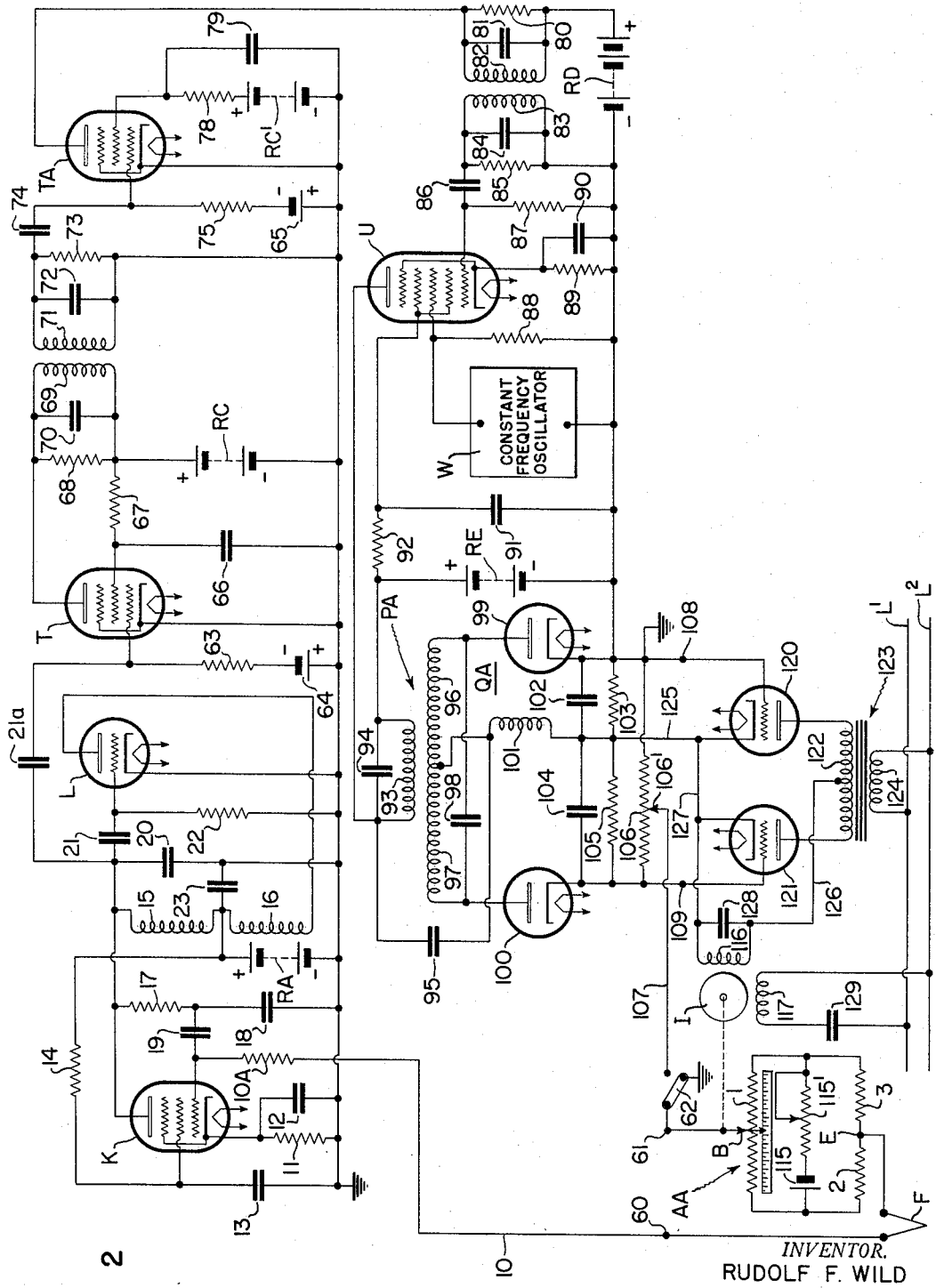

United States Patent Office 2,717,359
Patented Sept. 6, 1955

2,717,359

MEASURING APPARATUS

Rudolf F. Wild, Wilmington, Del., assignor to Minneapolis-Honeywell Regulator Company, Minneapolis, Minn., a corporation of Delaware Original application January 10, 1947, Serial No. 721,419. Divided and this application June 17, 1950, Serial No. 168,667

4 Claims. (Cl. 324—98)

The general object of the present invention is to provide an improved apparatus for measuring small unidirectional voltages, and for effecting control actions in accordance with the varying values of said voltages. A more specific object of the invention is to provide improved means for amplifying small unidirectional voltages without requiring them to be converted into alternating voltages prior to their amplification, and a still more specific object of the invention is the provision of relatively simple and effective means for utilizing high frequency alternating currents in the amplification of small unidirectional voltages.

In the practice of the present invention, use may be made of apparatus of various forms, some of which are illustrated and described herein by way of example. In general, the preferred embodiments of the present invention devised by me are alike in that each of them comprises a circuit network having input terminals and output terminals and including a high frequency electronic oscillator combined with a reactance control tube, and means for varying the amplification factor of the reactance tube thereby to vary the oscillator output frequency in automatic response to a variation in unidirectional voltage which is impressed on the network input terminals for amplification. The circuit network which I employ includes a frequency discriminating means with its input terminals connected to the output terminals of the oscillator, usually through amplifying means, and, in some cases, also through amplitude limiting means and frequency multiplier means. The output terminals of the frequency discriminator element of the amplifying network constitute the output terminals of said network.

The present invention is well adapted for various uses in which a minute unidirectional voltage is to be measured or utilized in producing control effects dependent on its varying value. Thus, for example, in one use of my invention, a thermocouple is connected to the input circuit of the network and a current created by the thermocouple voltage is so amplified that the thermocouple temperature can be measured by a milliammeter connected to the output terminals of the amplifying network. In addition to its use in the direct measurement of a thermocouple voltage as just mentioned, the invention may be used to control the operation of the reversible rebalancing motor of a self-balancing measuring apparatus of the well known type comprising a null type potentiometer bridge circuit and a measuring branch connected between points of the bridge circuit, one of which is adjusted by the motor in accordance with the varying value of a thermocouple voltage or other unidirectional voltage included in the measuring branch. The invention is also well adapted for use in the continuous automatic standardization of the bridge circuit of self-balancing potentiometric measuring apparatus as disclosed and claimed in my copending application, Serial No. 721,419, filed January 10, 1947, now Patent No. 2,569,791 of October 2, 1951, of which the present application is a division.

Apparatus constructed and operating in accordance with the present invention is characterized by its capacity for stable operation with high and regulable sensitivity. The utilization of high frequency currents in amplifying small unidirectional currents is characterized by the avoidance of interaction between the high frequency and unidirectional currents, and the ease with which high frequency currents can be separated from the unidirectional currents by relatively simple filter provisions. The invention is characterized also by the fact that it permits of high amplification of minute unidirectional voltages without objectionable drift and without requiring that, preparatory to its amplification, the unidirectional current be converted into an alternating current.

The various features of novelty which characterize my invention are pointed out with particularity in the claims annexed to and forming a part of this specification. For a better understanding of the invention, however, its advantages, and specific objects attained by its use, reference should be had to the accompanying drawings and descriptive matter in which I have illustrated and described preferred embodiments of the invention.

Of the drawings:

Fig. 2 is a diagram illustrating a modification of the network shown in Fig. 1.

Figure 1:
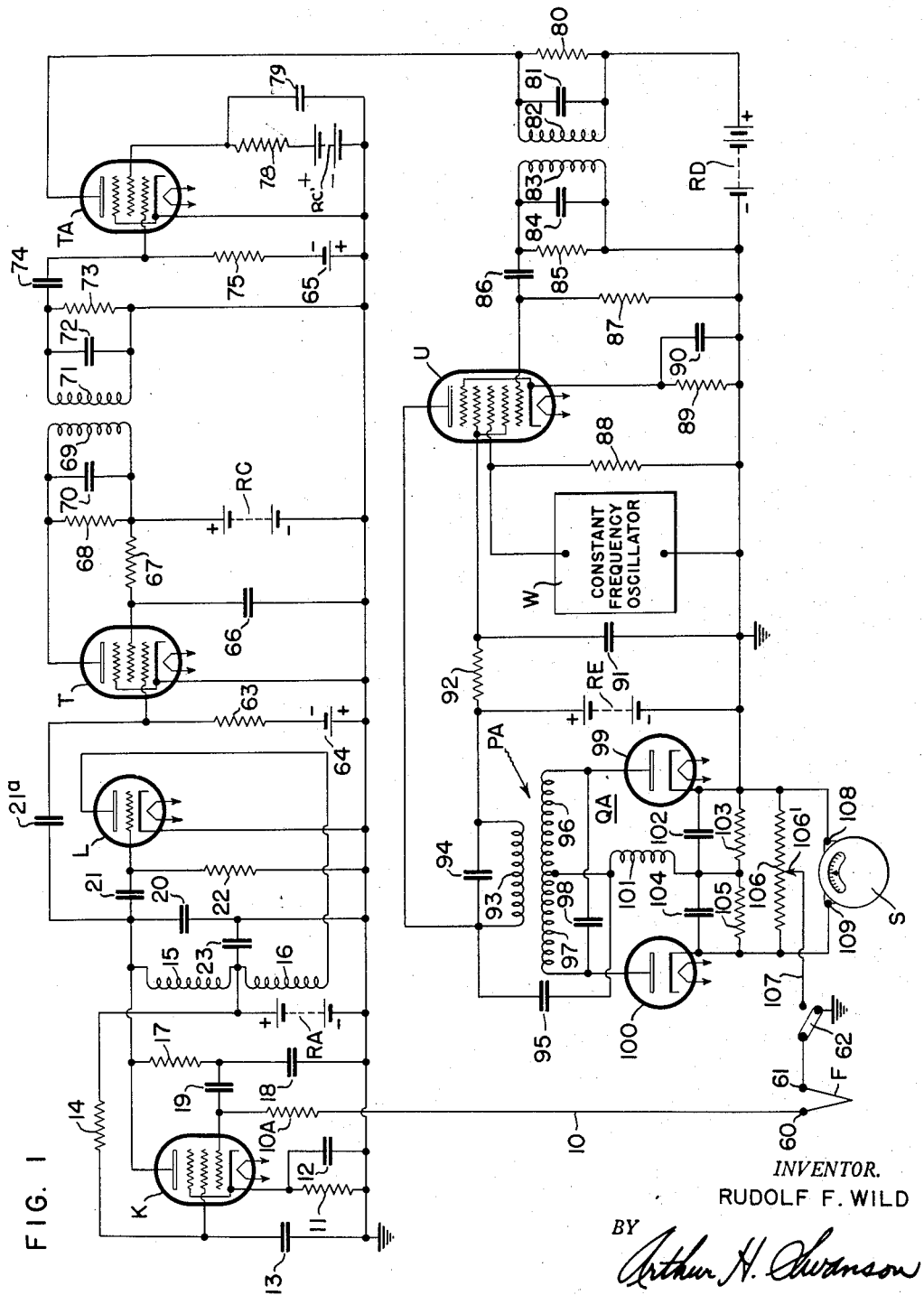
Fig. 1 is a diagrammatic representation of one embodiment of the invention.

In Fig. 1, I have diagrammatically illustrated a form of the present invention which is well adapted for use in amplifying small unidirectional signals for various purposes. The arrangement of Fig. 1 illustrates the use of the present invention in amplifying a minute thermocouple output voltage and in measuring the amplified voltage with an indicating meter S. The apparatus shown in Fig. 1 is well adapted for other uses, however, and by way of example I have illustrated in Fig. 2 another use of the invention. Thus, as is explained more fully hereinafter, the arrangement illustrated in Fig. 2 utilizes the Fig. 1 apparatus in controlling the operation of the rebalancing motor of a conventional self-balancing potentiometric measuring system.

In the arrangement shown in Fig. 1, a thermocouple F, the voltage of which is to be measured, is connected across the input terminals 60 and 61 of the amplifying network portion of the apparatus, and a direct current measuring instrument S, shown as an indicating meter, is connected across the output terminals 108 and 109 of the amplifying network. As shown, the input terminal 61 is directly connected to ground through a switch 62 when the latter occupies the position shown in Fig. 1. The input terminal 60 is connected through a conductor 10 and an isolation resistor 10A, which should have a relatively high resistance value, to the control grid of a reactance tube K controlling high frequency oscillator tube L.

The reactance tube K has its suppressor grid directly connected to its cathode, and has its screen grid connected to ground by a condenser 13. This screen grid is also connected through a resistance 14 to the connected ends of inductance coils 15 and 16 which are included in the circuit of the oscillator tube L. The second end of the coil 15 is connected to the anode of the tube K, and is connected to ground through a resistance 17 and a condenser 18 connected in series. The connected terminals of the resistance 17 and condenser 18 are connected through a condenser 19 to the control grid of the tube K. The anode of the tube K is also connected to ground through a condenser 20, and is connected through a condenser 21 to the control grid of the oscillator tube L. The last mentioned control grid is also connected to ground through a resistance 22.

The connected terminals of the coils 15 and 16 are connected to ground through a condenser 23, and the end of the coil 16 remote from the coil 15 is connected to the anode of the oscillator tube L. As shown, anode voltage is supplied to the tubes K and L by a battery RA, or other source of unidirectional current, which is connected between ground and the point of engagement of the coils 15 and 16. The cathode of the tube L is connected to ground. The cathode of the tube K is connected to ground through a bias resistance 11 shunted by a condenser 12.

As will be apparent to those skilled in the art without further explanation, the reactance tube K and oscillator tube L are combined in a well known manner for control of the oscillation frequency of the tube L by varying the gain, or amplification factor, of the tube K. The tube L is arranged to oscillate at a predetermined frequency when no signal is impressed on the control grid of the reactance tube K, and is arranged to oscillate at a frequency higher or lower than said predetermined frequency when a control signal is impressed on the control grid of the tube K and respectively increases or decreases the gain or amplification factor of the tube K.

In the arrangement shown in Fig. 1, the output circuit of the oscillator tube L is connected to the input circuit of a two stage frequency multiplier. The first stage includes a pentode tube T and the second stage includes a pentode tube TA. The output circuit of the oscillator tube L is connected to the input circuit of the tube T, and the output circuit of the tube T is connected to the input circuit of the tube TA. The output circuit of the tube TA is connected to the input circuit of a frequency mixer U. In the frequency mixer, the twice multiplied frequency output of the oscillator L is combined with the output of a constant frequency oscillator W to provide a beat frequency of lower value which is transmitted to the input circuit of a balanced frequency discriminator QA. The latter, as shown, is the widely used conventional type comprising two diodes, the cathodes of which are directly connected to the output terminals 108 and 109.

The frequency multiplier tube T has its suppressor grid connected to its cathode, and has the latter connected directly to ground. The control grid of the tube T is connected by a condenser 21a to the point of engagement of the condensers 20 and 21 and the anode of the tube K. The screen grid of the tube T is connected to ground by a condenser 66, and is connected by a resistance 67 to the positive terminal of a source of supply voltage RC, to which is connected also the anode of the tube T through a resistance 68 in parallel with a coupling coil 69 and a condenser 70. The negative terminal of the source RC is connected to ground.

For its intended use, the frequency multiplier is preferably of the harmonic distortion type, and may well be a class C amplifier, since the plate circuit of such an amplifier is rich in harmonics. For its frequency multiplier action, the plate circuit of the tube T may well be tuned to a frequency which is double the frequency of the signal supplied to the input circuit of the tube so that the output frequency of the tube T is then that of the second harmonic of the input frequency, i. e., the tube T is a frequency doubler. Thus, if the oscillation frequency of the tube L is 450 kc. per second, the plate circuit of the multiplier tube T is tuned to a frequency of 900 kc. per second, which would be the normal output frequency of the tube T. Class C amplifiers ordinarily are operated with a grid bias voltage double the value required for plate current cutoff. Grid bias may be supplied through a resistor 63 by a battery 64, as shown, or a power supply.

The multiplier tube TA may be operated as a class C amplifier exactly like the frequency multiplier tube T, except that, with the plate circuit of the tube T tuned to a frequency of 900 kc. per second, the plate circuit of the tube TA may be tuned to a frequency of 1800 kc. per second. The output circuit of the tube T is connected to the input circuit of the tube TA by coupling means comprising a coil 71 which is in inductive relation with the coil 69 and is connected in parallel with a condenser 72 and a resistance 73 between ground and one terminal of a condenser 74. The second terminal of the condenser 74 is connected to the control grid of the tube TA, and is also connected to ground through a resistance 75 and a battery 65 provided to supply suitable bias voltage to the control grid of tube TA. The cathode of the tube TA is connected directly to ground. The screen grid of the tube TA is connected to ground through a resistance 78 and a battery RC'. A condenser 79 connects this screen grid directly to ground. The anode of the tube TA is connected through a resistance 80, a condenser 81, and an inductance winding 82, in parallel with one another, to a source of unidirectional current RD, shown as a battery connected between the last mentioned anode and ground.

The winding 82 is in inductive relation with an inductance winding 83. The latter is connected in parallel with a condenser 84 and a resistance 85, and in series with a condenser 86 between ground and one of the two control grids of the mixing tube U. The latter is a pentagrid tube and may well be of the commercially available 6L7 type. Said one control grid is also connected to ground by a resistance 87. The second control grid of the tube U is connected to ground by a resistance 88, and is also connected to one output terminal of the constant frequency oscillator W which has its second output terminal connected to ground. The cathode of the tube U is connected to ground by a resistance 89 and a condenser 90 in parallel therewith. Said second control grid is the central one of the five grids of the tube U. The suppressor grid of the tube U is connected to the cathode of the tube, and the other two grids, which serve as screen grids, are connected to each other and are connected to ground through a condenser 91. These grids are also connected through a resistance 92 to the positive terminal of a battery RE, the negative terminal of which is grounded, and to one terminal of an inductance winding 93 and a condenser 94 in parallel with the winding 93. The second terminals of the winding 93 and condenser 94 are connected to the anode of the tube U.

The winding 93 forms the primary winding of an intermediate frequency or discriminator transformer PA through which the output circuit of the mixer U is connected to the input circuit of the frequency discriminator QA. The secondary winding of the transformer PA is divided into two sections 96 and 97. The midpoint of the divided secondary winding is connected by a condenser 95 to the second terminals of the primary winding 93 and condenser 94. The secondary winding sections 96 and 97 are shunted by a condenser 98, and are respectively connected to the anodes of diode valves 99 and 100 included in the balanced frequency discriminator QA. The point of engagement of the windings 96 and 97 is connected by a choke coil 101 to the cathode of the tube 99 through a condenser 102 and a parallel connected resistance 103, and is connected to the cathode of the diode 100 through the coil 101, a condenser 104, and a parallel connected resistance 105. A resistor 106 is connected in shunt to the series connected resistors 103 and 105. The cathode of the valve 99 is connected to ground, and a contact 106' engaging and adjustable along the resistance 106 is connected to one end of a feedback conductor 107. The cathodes of the diodes 99 and 100 are connected to the respective output terminals 108 and 109 of the amplifying network.

In a balanced frequency discriminator of the type shown at QA in Fig. 1, the currents flowing in the windings 96 and 97 are of equal magnitude when the frequency of the signal transmitted to the discriminator QA from the mixer U is the frequency to which the discriminator is tuned, i. e., is the resonant frequency of the divided secondary windings 96 and 97 and the tuning condenser 98. When the frequency of the signal received from the mixer tube U by the transformer PA is the discriminator resonant frequency, substantially the same potentials are impressed across the diodes 99 and 100.

The above results from the fact that, at resonance, the voltages produced across the windings 96 and 97, which voltages are in phase opposition, are also in phase quadrature with the voltage across the winding 101. As the applied frequency deviates from the value to which the discriminator is tuned, this phase relationship changes, so that the voltage obtained by vectorially adding the voltages across the windings 96 and 101 is no longer equal and opposite to the sum of the voltages across the windings 97 and 101. Instead, the sum of the voltages across windings 96 and 101 and the sum of the voltages across windings 97 and 101 are varied in accordance with the direction and magnitude of the frequency deviation of the input frequency from the resonant frequency of the discriminator. In consequence, there will be produced corresponding variations in the unidirectional voltage drops developed across resistors 103 and 105, which variations produce between the terminals 108 and 109 a unidirectional voltage having a magnitude which is a function of the magnitude of the departure of the frequency of the input signal applied to the discriminator from the resonant discriminator frequency, and having a polarity which is dependent upon the direction of said departure.

As previously stated, in the arrangement shown in Fig. 1, an indicating meter S is connected between the output terminals 108 and 109 and provides a suitably amplified measure of the voltage of the thermocouple F. For the use of the circuit network illustrated in Fig. 1, the switch 62 occupies the position shown, and no use is made of the resistance 106 and conductor 107.

The network shown in Fig. 1 has certain characteristics especially advantageous for particular uses. The frequency multipliers T and TA materially increase the sensitivity of the amplifying system by quadrupling the frequency change produced by a particular change in the E. M. F. of the thermocouple F. Even greater sensitivity may be obtained if the frequency multipliers are made frequency triplers. With the mixing valve U connected in circuit as shown, the frequency to which the discriminator QA responds is not the high output frequency of the second stage frequency multiplier TA, but is a beat frequency nearer to the order of the output frequency of the oscillator L.

The purpose of frequency multiplication in the arrangement of Fig. 1 and the subsequent heterodyning to a lower beat frequency is to increase substantially the percentage frequency deviation caused by a change in thermocouple E. M. F., and, thereby, to effect a corresponding increase in the system sensitivity.

While the range over which the multiplier stages provide frequency multiplication is quite narrow, the sensitivity of the frequency discriminator QA is so high as to permit the required frequency shift in the system to be kept within said narrow range. Thus, for example, if the frequency of the input signal to the multiplier T is 450 kc. per second, the limits within which the tuned circuit included in the plate circuit of the multiplier tube T will be resonant is of the order of 4½ kc. per second. However, a characteristic of the frequency discriminating QA is that its voltage output may be varied through its complete range of variation when the frequency of the applied signal is changed through a range less than the 4½ kc. per second available. The amplitude of the output signals of each of the multipliers T and TA decreases as the input signal to the amplifier departs from the exact resonant frequency, and since the frequency discriminator QA is responsive to the amplitude as well as the frequency of the signals received by it, it may be desirable, in some cases, to place a limiter between the output circuit of the mixer U and the discriminator QA.

The amount of amplification obtainable with the network of Fig. 1 is limited only by the amount of frequency multiplication provided. The stability of the amplifying network shown in Fig. 1 is limited only by the constancy of the reactance tube and of the frequency discriminator, and is independent of the gain or amplification. The network shown in Fig. 1 may be adjusted by proper choice of circuit components so that with a zero input signal, the discriminator QA is in perfect balance and no output signal is produced.

In Fig. 2, I have illustrated the use of the amplifying network shown in Fig. 1 in controlling the rebalancing motor of a self-balancing potentiometric measuring circuit generally of the type shown in the Wills Patent 2,423,540. The potentiometric bridge circuit AA of Fig. 2 includes a slide wire resistance 1 which is connected in parallel with a bridge energizing branch and a second branch including series connected resistors 2 and 3 having a common terminal E. The energizing branch includes a battery 115 and a calibrating rheostat 115' connected in series.

In Fig. 2, the input terminals 60 and 61 of the amplifying network of Fig. 1 are connected in the measuring circuit of the potentiometric bridge circuit. Thus, the bridge point E of the circuit AA is connected to one terminal of the thermocouple F, and the second terminal of the thermocouple is connected to the input terminal 60. The slider contact B of the slide wire resistance 1 is connected to the network input terminal 61. The contact B is given rebalancing adjustments, as the voltage of the thermocouple F changes, by a reversible rebalancing motor I having a control winding 116 and a power winding 117. The operation of the motor I is controlled by the voltage between the output terminals 108 and 109 of the amplifying network.

As diagrammatically shown in Fig. 2, the output terminals 108 and 109 of the amplifying network are connected to the control grids of motor drive tubes 120 and 121, respectively. The tubes 120 and 121 are triodes which may be of the 7N7 type and may be enclosed in a single envelope. Their anodes are connected to the opposite ends of the secondary winding 122 of a transformer 123. The latter has its primary winding 124 connected across alternating current supply conductors L' and L², supplying current of conventional voltage and frequency, for example, 115 volts and 60 cycles per second. The cathodes of the tubes 120 and 121 are connected to each other and are connected by a conductor 125 to the connected terminals of the resistances 103 and 105, which have their other terminals respectively connected to the cathodes of the discriminator tubes 99 and 100. The midpoint of the secondary winding 122 is connected by a conductor 126 to one terminal of the control winding 116 of the rebalancing motor I, and the other terminal of the winding 116 is connected through a conductor 127 to the cathodes of the tubes 120 and 121. A condenser 128 is connected in parallel with the winding 116. The power winding 117 of the motor I is connected across the supply conductors L' and L² in series with a condenser 129. For the use illustrated in Fig. 2, the amplifying network is preferably arranged as for the use illustrated in Fig. 1, so that the potential difference between the output terminals 108 and 109 will be proportional to, though much larger than, the potential difference impressed on the input terminals 60 and 61.

In the normal operation of the apparatus shown in Fig. 2, the switch 62 occupies the position shown. When the E. M. F. of the thermocouple F is balanced by the potential difference between the bridge circuit point E and the slider contact B, no signal is impressed on the network input terminals 60 and 61, and there is then no potential difference between the output terminals 108 and 109. Under this condition of operation, pulses of current equal in magnitude will flow in the control winding 116 from the anode circuits of the tubes 120 and 121 during each succeeding half cycle of the alternating voltage supplied by the transformer secondary winding 122. Thus, for the balanced condition under consideration, pulsating current of twice the frequency of the alternating voltage supplied by the transformer winding 122 is supplied to the motor winding 116. When thus energized, the motor I is not effectively urged for rotation in either direction, but remains stationary. Due to the relatively high direct current component of the current then flowing through the motor winding 116, the core structure of the motor tends to be saturated, thereby making the inductive reactance of the winding 116 relatively small. The condenser 128 in parallel with the motor winding 116 unites with the latter to form a parallel resonant circuit. The saturation of the core structure of the motor I operates to exert an appreciable damping effect on the rotor of the motor tending to prevent rotation of the latter, and when such saturation occurs with the motor in rotation, the saturation of the core structure operates to quickly stop the motor.

When a change in the E. M. F. of the thermocouple unbalances the measuring circuit of Fig. 2, a potential difference between the terminals 60 and 61 is created. This results in a change in the potentials of the cathodes of tubes 99 and 100 as will be apparent from the previous description of Fig. 1. In consequence, the potential drop across the resistance 103 is then caused to differ from the potential drop across the resistance 105. As a result, the magnitude of the pulses of current flowing through the winding 116 from one of the tubes 120 and 121 will increase, and the magnitude of the pulses of current flowing through the winding from the other tube will be decreased. When the winding 116 is thus energized, the direct current component of the current flowing through the winding 116 is decreased, and the saturation of the motor core structure, and its damping effect, are reduced. In addition, the alternating component of the current supplied to the winding 116 is increased. This alternating component produces an alternating field in the motor structure which reacts with the alternating field established by the power winding 117 to produce a rotating field which causes rotation of the motor rotor. The condenser 129 unites with the winding 117 to form a series resonant circuit.

The direction of rotor rotation thus caused depends upon the direction of current flow through the thermocouple, i. e., upon whether the change in thermocouple voltage is an increase or a decrease. In either event, the direction of movement of the motor is that required for adjustment of the contact B into the position in which the potential difference between the contact B and bridge point E balances the electromotive force of the thermocouple.

A more detailed explanation of the operation of the motor I in response to the motor drive currents produced by the tubes 120 and 121 is not thought to be necessary herein, since such an explanation is included in the aforementioned Wills patent.

While, in accordance with the provisions of the statutes, I have illustrated and described the best forms of embodiment of my invention now known to me, it will be apparent to those skilled in the art that changes may be made in the forms of the apparatus disclosed without departing from the spirit of my invention as set forth in the appended claims, and that in some cases certain features of my invention may be used to advantage without a corresponding use of other features.

Having now described my invention, what I claim as new and desire to secure by Letters Patent, is:

1. Self-balancing measuring apparatus comprising in combination, a bridge circuit including a slide wire resistor and cooperating slider contact, a circuit portion including terminals adapted to be connected to a source of voltage to be measured and connected between said slider contact and a fixed point in said bridge circuit, a reversible motor for adjusting said slider contact as required to balance the potential difference between said slider contact and fixed point against the voltage of said source, means for producing a high frequency alternating current comprising an oscillator tube having an input circuit and an output circuit, reactance tube means responsive to current flow through said circuit portion for increasing or decreasing the frequency of said high frequency current accordingly as said current flow is in one direction or in the opposite direction, a balanced frequency discriminator having an input circuit connected to the output circuit of said oscillator and having an output circuit, and controlling means for said motor connected to the last mentioned output circuit.

2. Self-balancing measuring apparatus comprising in combination, a bridge circuit including a slide wire resistor and cooperating slider contact, a circuit branch including terminals adapted to be connected to a source of voltage to be measured and connected between said slider contact and a fixed point in said bridge circuit, a reversible motor having a power winding and a control winding and adapted for operation to adjust said slider contact as required to balance the potential difference between said slider contact and fixed point against the voltage of said voltage source, means comprising an oscillator having input and output circuits for producing a high frequency alternating current, reactance tube means responsive to current flow through said circuit branch and operatively connected to said oscillator input circuit for increasing or decreasing the frequency of said high frequency current accordingly as said current flow is in one direction or in the opposite direction, two electronic valves, supply conductors adapted to supply alternating current to said power winding, a transformer having a primary winding connected across said supply conductors and having a secondary winding with one end connected to one terminal of said control winding through one of said valves and with its other end connected to said one terminal of said control winding through the other of said valves, said secondary winding having its mid point connected to the second terminal of said control winding, and a balanced frequency discriminator having an input circuit connected to the output circuit of said oscillator and comprising means for increasing the current flow through one of said valves and decreasing the current flow through the other of said valves on a change in the frequency of said high frequency current.

3. Self-balancing measuring apparatus comprising in combination, a bridge circuit including a slide wire resistor and cooperating slider contact, a circuit branch including terminals adapted to be connected to a source of voltage to be measured and connected between said slider contact and a fixed point in said bridge circuit, a reversible motor having a power winding and a control winding and adapted for operation to adjust said slider contact as required to balance the potential difference between said slider contact and fixed point against the voltage of said voltage source, means comprising an oscillator having input and output circuits for producing a high frequency alternating current, reactance tube means responsive to current flow through said circuit branch and operatively connected to said oscillator input circuit for increasing or decreasing the frequency of said high frequency current accordingly as said current flow is in one direction or in the opposite direction, a balanced frequency discriminator having an input circuit connected to the output circuit of said oscillator and having two output circuit portions and means for maintaining potentials in said portions which vary inversely as the frequency of said high frequency current is varied, supply conductors adapted to supply alternating current to said power winding, a transformer having a primary winding connected to said supply conductors and having a secondary winding, a pair of electronic valves each having an anode, a cathode, and a control grid, said secondary winding having one end connected to the anode of one of said valves and having its other end connected to the anode of the other of said valves, said secondary winding having its mid point connected to one terminal of said control winding, means connecting the other terminal of said control winding to said cathodes, and means connecting the control grid of one of said valves to one of said discriminator portions and connecting the control grid of the other of said valves to the other of said discriminator portions.

4. Apparatus responsive to the magnitude of a small unidirectional voltage, comprising signal producing means including a frequency determining portion and an output portion and operative to produce in said output portion a high frequency signal of a frequency determined by said frequency determining portion, reactance tube means including a control circuit and an output circuit and having an amplification factor which is dependent upon the magnitude of a unidirectional voltage applied to said control circuit, circuit means adapted to connect a source of unidirectional voltage to said control circuit, whereby the amplification factor of said reactance tube means is controlled in accordance with the magnitude of the last mentioned voltage, said circuit means including a potentiometric circuit including an adjustable source of voltage adapted to be connected in series voltage opposition with the first mentioned source of voltage to said control circuit, means connecting said output circuit into said frequency determining portion, whereby the frequency of said high frequency signal has a value dependent upon that of said last mentioned voltage, a balanced frequency discriminator having an input circuit coupled to said output portion and having an output circuit and operative to produce in the last mentioned output circuit an output signal having a magnitude dependent upon the frequency of said high frequency signal, and a responsive indicating device coupled to the output circuit of said discriminator and responsive to the magnitude of said output signal and hence to the magnitude of said last mentioned voltage, said responsive device including an electric motor controlled by said output signal, said motor being mechanically coupled to said adjustable source of voltage and being operative under the control of said output signal to adjust the voltage of the last mentioned source as necessary to interrupt the operation of said motor.

References Cited in the file of this patent
UNITED STATES PATENTS

| | | |
|---|---|---|
| 2,211,010 | Hallmark | Aug. 13, 1940 |
| 2,246,164 | Crosby | June 17, 1941 |
| 2,279,659 | Crosby | Apr. 14, 1942 |
| 2,337,328 | Hathaway | Dec. 21, 1943 |
| 2,423,103 | Koechlin | July 1, 1947 |
| 2,423,616 | Rath | July 8, 1947 |
| 2,443,746 | Peterson | June 22, 1948 |
| 2,456,763 | Ziegler | Dec. 21, 1948 |
| 2,567,896 | Semm | Sept. 11, 1951 |